United States Patent
Lu et al.

(10) Patent No.: US 10,518,252 B1
(45) Date of Patent: Dec. 31, 2019

(54) CARBON NITRIDE MEMBRANE COMPOSITE MATERIAL MODIFIED BY BLACK PHOSPHORUS/ METAL ORGANIC FRAMEWORK, AND PREPARATION METHOD THEREOF AND APPLICATION IN WASTE GAS TREATMENT

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/440,163

(22) Filed: Jun. 13, 2019

(30) Foreign Application Priority Data

Jun. 14, 2018 (CN) .......................... 2018 1 0616282

(51) Int. Cl.
*B01J 27/24* (2006.01)
*B01J 35/00* (2006.01)
(Continued)

(52) U.S. Cl.
CPC .......... *B01J 27/24* (2013.01); *B01D 53/8628* (2013.01); *B01J 31/2213* (2013.01);
(Continued)

(58) Field of Classification Search
CPC .. B01D 53/56; B01D 53/565; B01D 53/8625; B01D 53/9409; B01D 63/00; B01D 67/0067; B01D 67/0079; B01D 69/00; B01D 71/00; B01D 71/02; B01D 2257/404; B01D 2258/012; B01D 2311/00; B01D 2323/00; B01J 15/00; B01J 19/2475; B01J 2219/00907; B01J 2219/00936;
(Continued)

(56) References Cited

U.S. PATENT DOCUMENTS

| | | | | |
|---|---|---|---|---|
| 10,441,945 B2 * | 10/2019 | Lu | .......................... | B01J 35/004 |
| 2017/0173571 A1 * | 6/2017 | Lu | ........................ | B01J 37/0221 |
| 2019/0330061 A1 * | 10/2019 | Lu | ............................ | B01J 27/24 |

FOREIGN PATENT DOCUMENTS

| | | | | |
|---|---|---|---|---|
| CN | 106039988 | * | 5/2016 | ......... B01D 53/8628 |
| CN | 108855191 A | * | 11/2018 | |
| JP | 2008200653 A | * | 9/2008 | ............ B01J 29/035 |

* cited by examiner

*Primary Examiner* — Timothy C Vanoy
(74) *Attorney, Agent, or Firm* — SZDC LAW P.C.

(57) ABSTRACT

A carbon nitride membrane composite material modified by black phosphorus/metal organic framework (MOF) and a preparation method and application thereof to waste gas treatment are disclosed. First, taking urea as a raw material to calcine at a high temperature and prepare porous carbon nitride nanosheet; then carrying out surface carboxylation on the porous carbon nitride nanosheet, and modifying metal organic framework (MOF) on the surface of the porous carbon nitride through a layer-by-layer self-assembling method; stripping block black phosphorus materials into a two-dimensional black phosphorus slice by solvent exfoliation method; mixing the MOF-modified porous carbon nitride material with the two-dimensional black phosphorus material, carrying out suction filtration on the mixture under a vacuum pump to obtain the black phosphorus/MOF-modified carbon nitride membrane composite material.

17 Claims, 5 Drawing Sheets

(51) Int. Cl.
*B01D 53/86* (2006.01)
*B01J 31/22* (2006.01)
*B01J 35/06* (2006.01)
*B01J 37/08* (2006.01)

(52) U.S. Cl.
CPC ......... *B01J 35/004* (2013.01); *B01J 35/0033* (2013.01); *B01J 35/065* (2013.01); *B01J 37/082* (2013.01); *B01D 2255/802* (2013.01)

(58) Field of Classification Search
CPC ............ B01J 2219/08; B01J 2219/0875; B01J 2219/12; F01N 2570/14
See application file for complete search history.

CARBON NITRIDE MEMBRANE COMPOSITE MATERIAL MODIFIED BY BLACK PHOSPHORUS/ METAL ORGANIC FRAMEWORK, AND PREPARATION METHOD THEREOF AND APPLICATION IN WASTE GAS TREATMENT

This application claims priority to Chinese Patent Application No.: 201810616282.6, filed Jun. 14, 2018, which is incorporated by reference for all purposes as if fully set forth herein.

FIELD OF THE INVENTION

The present invention belongs to the technical field of functional materials, and particularly relates to carbon nitride membrane composite material modified by black phosphorus/metal organic framework (MOF), its preparation method and its application in waste gas photocatalytic treatment.

TECHNICAL BACKGROUND

Air pollution is one of the great problems facing China at present. With the development of Chinese economy, photochemical smog, smog and PM 2.5 (PM is a particulate matter) are becoming more and more serious, which has caused huge influences on daily life and physical health. Air pollution is mainly caused by outdoor and indoor pollutants. Outdoor gas pollutants include respirable particulate matter, nitrogen oxides, sulfur dioxide and carbon monoxide, while indoor air pollutants mainly include formaldehyde, toluene and hydrocarbons. At present, with the rapid increase in the number of automobiles in China, the emission of automobile exhausts has increased the degree of air pollution, and nitrogen oxide is one of the typical gaseous environmental pollutants. With the continuous development and advancement of science, the current methods for treating exhaust gas include activated carbon adsorption method, catalytic combustion method, biological filtration, acid-base neutralization method, etc., but the above methods have the advantages of expensive, difficult to regenerate, and only suit for high concentration exhaust gas, and it is extremely ineffective in treating low concentrations of harmful gases remaining in the air. However, for the treatment of low-concentration exhaust gas, semiconductor photocatalysis is considered to be one of the most promising technologies. Due to its high efficiency and environmental characteristics, semiconductor photocatalysis has potential value in solving global energy shortages. However, the effect of existing treatment agents on the degradation of nitric oxide is far from the expected effect.

SUMMARY OF THE INVENTION

The object of the present invention is to provide a carbon nitride membrane composite material modified by black phosphorus/metal organic framework (MOF) and a preparation method thereof, and the block black phosphorus is separated by a solvent method to form a two-dimensional sheet-like black phosphorus material. The carbon nitride is modified by a metal organic framework (MOF) and then combined with black phosphorus to form a macroscopic black phosphorus/metal organic framework (MOF) modified carbon nitride membrane to achieve the wide application of this material in the photocatalytic degradation of nitrogen oxides.

In order to achieve the above object, the technical solution of the present invention is described as follows:

A preparation method of a carbon nitride membrane composite material modified by black phosphorus/metal organic framework, comprising the following steps:

(1) using urea as a raw material, calcining to prepare porous carbon nitride nanosheet;

(2) carrying out carboxylation on the porous carbon nitride nanosheet, and modifying metal organic framework on it to obtain porous carbon nitride material modified by metal organic framework;

(3) stripping block black phosphorus into a two-dimensional black phosphorus slice by solvent exfoliation method;

(4) dispersing the porous carbon nitride material modified by metal organic framework and the two-dimensional black phosphorus slice in an organic solvent, stirring at room temperature and suction filtrating to obtain the carbon nitride membrane composite material modified by black phosphorus/metal organic framework.

A preparation method of a black phosphorus/metal organic framework modified carbon nitride membrane composite system, comprising the following steps:

(1) using urea as a raw material, calcining to prepare porous carbon nitride nanosheet;

(2) carrying out carboxylation on the porous carbon nitride nanosheet, and modifying metal organic framework on it to obtain porous carbon nitride material modified by metal organic framework;

(3) stripping block black phosphorus into a two-dimensional black phosphorus slice by solvent exfoliation method;

(4) dispersing the porous carbon nitride material modified by metal organic framework and the two-dimensional black phosphorus slice in an organic solvent, stirring at room temperature to obtain the black phosphorus/metal organic framework modified carbon nitride membrane composite system.

A preparation method of a porous carbon nitride material modified by metal organic framework, comprising the following steps:

(1) using urea as a raw material, calcining to prepare porous carbon nitride nanosheet;

(2) carrying out carboxylation on the porous carbon nitride nanosheet, and modifying metal organic framework on it to obtain porous carbon nitride material modified by metal organic framework.

A method of treating exhaust gas, comprising the following steps:

(1) using urea as a raw material, calcining to prepare porous carbon nitride nanosheet;

(2) carrying out carboxylation on the porous carbon nitride nanosheet, and modifying metal organic framework on it to obtain porous carbon nitride material modified by metal organic framework;

(3) stripping block black phosphorus into a two-dimensional black phosphorus slice by solvent exfoliation method;

(4) dispersing the porous carbon nitride material modified by metal organic framework and the two-dimensional black phosphorus slice in an organic solvent, stirring at room temperature and suction filtrating to obtain the carbon nitride membrane composite material modified by black phosphorus/metal organic framework;

(5) under illumination, passing the exhaust gas through the carbon nitride membrane composite material modified by black phosphorus/metal organic framework to carry out the gas treatment.

The preparation method of carbon nitride membrane composite material modified by black phosphorus/metal organic framework disclosed in the present invention includes these steps, (1) preparing porous carbon nitride nanosheet by using urea as a raw material and calcining at a high temperature;

(2) the porous carbon nitride nanosheet is surface-carboxylated with succinic anhydride to obtain a carbon nitride material rich in carboxyl groups on the surface, and then the raw material are modified by copper nitrate and trimensic acid, with gradually layer-by-layer self-assemble method, the porous carbon nitride surface is modified with MOF material to obtain MOF modified porous carbon nitride composite material;

(3) placing the block black phosphorus material in an organic solvent, and obtaining a two-dimensional black phosphorus sheet by ultrasonic stripping;

(4) MOF-modified porous carbon nitride and black phosphorus sheet are simultaneously dispersed in a solvent and uniformly mixed, and then the mixture is suction-filtered into a macroscopic catalyst film material by a vacuum pump, to obtain a carbon nitride membrane composite material modified by black phosphorus/metal organic framework (MOF).

In above technical solution, in the step (1), the urea is placed in the porcelain crucible, and an appropriate amount of water is added, calcining at 300 to 500° C. for 3 to 5 hours in air; the rate of temperature rise is 2 to 15° C. per minute. A pale yellow porous sheet-like carbon nitride is obtained and ground into a powder. Under this condition, a large amount of sheet-like carbon nitride can be obtained simply and efficiently. The invention adopts a simple calcination method to prepare a carbon nitride material having a large surface area, which can enhance the entry and diffusion of exhaust gas, and is a good material.

In above technical solution, in the step (2), The mass ratio of porous carbon nitride, succinic anhydride and N,N-dimethylformamide is 1:(10-20):(40-50), stirring at room temperature for 10-15 hours, and the stirring time is preferably 12 hours; at a mass ratio of 1:(10 to 20), mixing the porous carbon nitride nanosheet and succinic anhydride in a solvent, carrying out reaction at room temperature for 10-15 hours to complete the carboxylation of the porous carbon nitride nanosheet; immersing the carboxylated porous carbon nitride nanosheet sequentially in a copper nitrate solution and a trimesic acid solution to complete the modification of metal organic framework; the mass ratio of the carboxylated porous carbon nitride nanosheet, copper nitrate and trimesic acid is 1:(2~3):(1~2), and the time of immersing in the copper nitrate solution and the trimesic acid solution is respectively 10 to 20 minutes and 25 to 40 minutes. In the process of self-assembly and modification of MOF, the mass ratio of porous carbon nitride, copper nitrate and trimesic acid is 1:(2~3):(1~2), and the porous carbon nitride is first dispersed in the ethanol solution of copper nitrate. The mixture is stirred for 10 to 20 minutes, washed with ethanol, and then stirred in a solution of trimesic acid for 25 to 40 minutes, and then washed with ethanol, preferably repeating the above process a plurality of times.

In the above technical solution, in the step (2), after the stirring is completed, the product is washed with an ethanol solution, and then centrifuged, and finally vacuum dried for 3 to 6 hours to prepare a MOF-modified porous carbon nitride material.

The invention adopts a simple layer-by-layer self-assembly method to successfully modify the MOF material with large surface area to the catalyst material, and the good gas adsorption performance of the MOF material can increase the instantaneous concentration of the exhaust gas around the catalyst, thereby achieving the purpose of increasing the reaction rate.

In the above technical solution, in the step (3), the mass ratio of block black phosphorus and solvent N-methylpyrrolidone is 1:(100 to 150); performing ultrasonic peeling using a cell pulverizer to get the two dimensional black phosphorus sheet, and the peeling time is 4 to 8 hours. The invention uses a simple solvent stripping method to peel off the block black phosphorus material, enhancing the absorption of visible light by the black phosphorus material and the conductivity of the material.

In the above technical solution, in the step (4), the mass ratio of the porous carbon nitride material modified by metal organic framework and the two-dimensional black phosphorus slice is 100:(2 to 10), mixing and stirring at room temperature for 6 to 8 hours, and finally filtrating into a membrane to obtain the carbon nitride membrane composite material modified by black phosphorus/metal organic framework. The invention adopts a simple method to obtain a macroscopic catalyst film, which is advantageous for multiple recycling.

The invention adopts urea as a starting material, and is calcined at a high temperature to prepare a porous sheet-like carbon nitride material; the carbon nitride material is carboxylated by succinic anhydride, and the MOF material is modified by layer-by-layer self-assembly on the surface thereof. The block black phosphorus is stripped into a two-dimensional black phosphorus sheet material by solvent exfoliation method; the MOF modified porous carbon nitride material and the two-dimensional black phosphorus material are mixed, and black phosphorus/metal organic framework (MOF) modified carbon nitride membrane is obtained by suction filtration. Due to the introduction of black phosphorus, the photocatalyst material has a strong absorption capacity for visible light, and the composite material has a suitable band gap and has good electrical conductivity, which can greatly improve the photocatalytic performance. Therefore, the present invention discloses the use of the above-mentioned black phosphorus/metal organic framework (MOF) modified carbon nitride membrane composite material for photocatalytic degradation of nitric oxide in exhaust gas. Meanwhile, the present invention also discloses the above carbon nitride membrane composite material modified by black phosphorus/metal organic framework in the use of exhaust gas treatment, especially in photocatalytic degradation of exhaust gases such as nitrogen monoxide.

Advantages of the Invention

1. The black phosphorus/metal organic framework (MOF) modified carbon nitride membrane composite material disclosed in the invention has simple preparation method, easy availability of raw materials, simple operation and is critical for industrial application.

2. In the black phosphorus/metal organic framework (MOF) modified carbon nitride membrane composite material disclosed by the invention, the photocatalytic degradation of nitric oxide by carbon nitride has a good effect, through the modification of the carbon nitride material, a porous carbon nitride is obtained, so it can further enhance the permeability of gas molecules and enhance the transparency of visible light; the introduction of two-dimensional black phosphorus material as a conductive material can greatly improve the efficiency of electron transport and has a strong absorption of visible light, so as to increase the ability of degradation effect; the photocatalyst film is a macroscopic material, which is beneficial to the recovery and reuse of the photocatalyst, and at the same time can increase the adsorption effect on the gas, and has a good application prospect.

3. The black phosphorus/metal organic framework (MOF) modified carbon nitride membrane composite material disclosed in the invention has the advantages of high light absorption efficiency, good catalytic effect, stable performance, convenient and repeated use. The new composite material has high photocatalytic effect on the degradation of nitric oxide and can be used for the treatment of gas pollution in various environments.

DETAILED DESCRIPTION OF THE INVENTION

Embodiment 1

Figure 1:
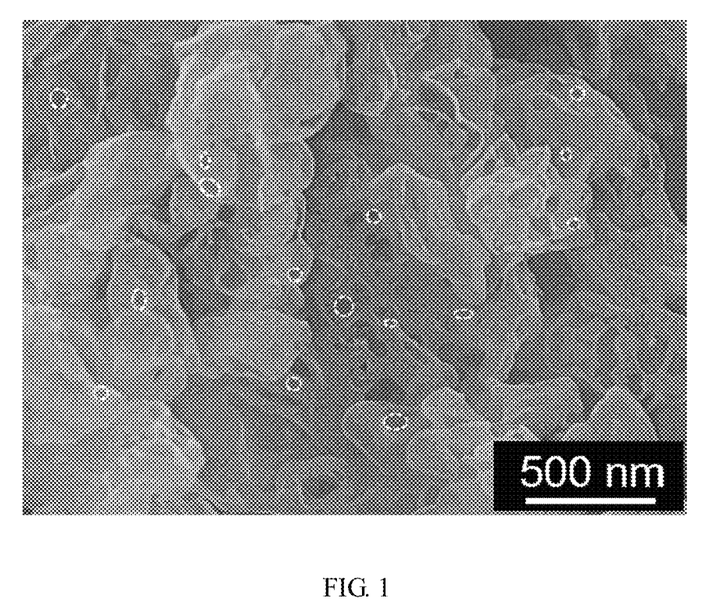
FIG. 1 is the SEM image of porous carbon nitride nanosheet.
Figure 2:
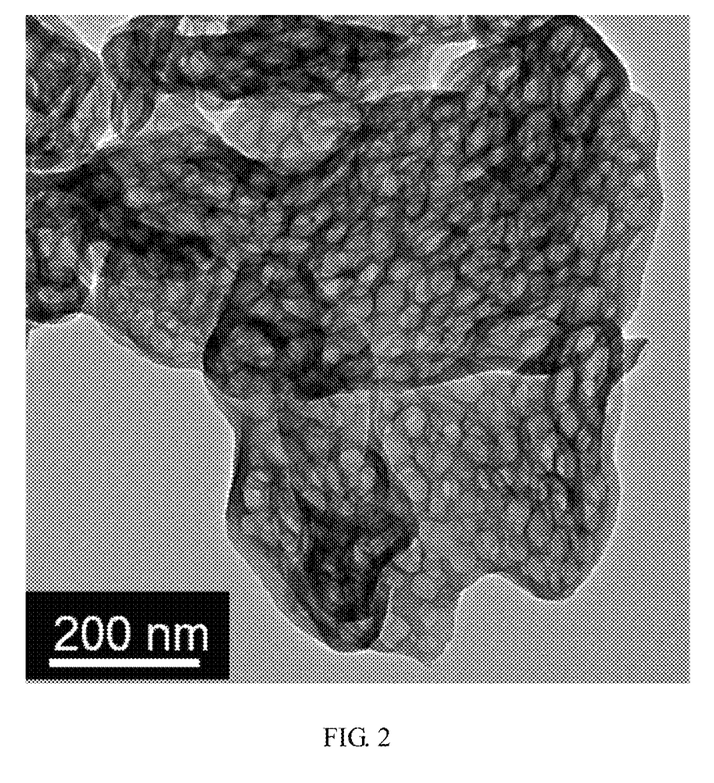
FIG. 2 is the TEM image of porous carbon nitride nanosheet.

The specific steps of preparing porous carbon nitride are as follows:
10 g of urea is placed in a porcelain crucible, and 15 mL of water is added, placed in a muffle furnace, heated to 400° C. at a heating rate of 10° C. per minute, and calcined for 1 hour. Then, the temperature is further raised to 450° C., the heating rate is 10° C. per minute, and calcination is continued for 1 hour to obtain a pale yellow porous carbon nitride nanosheet, which is ground into a powder; and FIG. 1 and FIG. 2 are the SEM and TEM images of porous carbon nitride respectively.

The preparation of porous carbon nitride modified by MOFs is as follows:
First, the porous carbon nitride nanosheet is subjected to surface carboxylation modification, and 0.05 g of porous carbon nitride and 0.6 g of succinic anhydride are dispersed to 25 mL of N, N-dimethylformamide, then stirred at room temperature for 12 hours and then washed with deionized water and ethanol for three times respectively.

Figure 3:
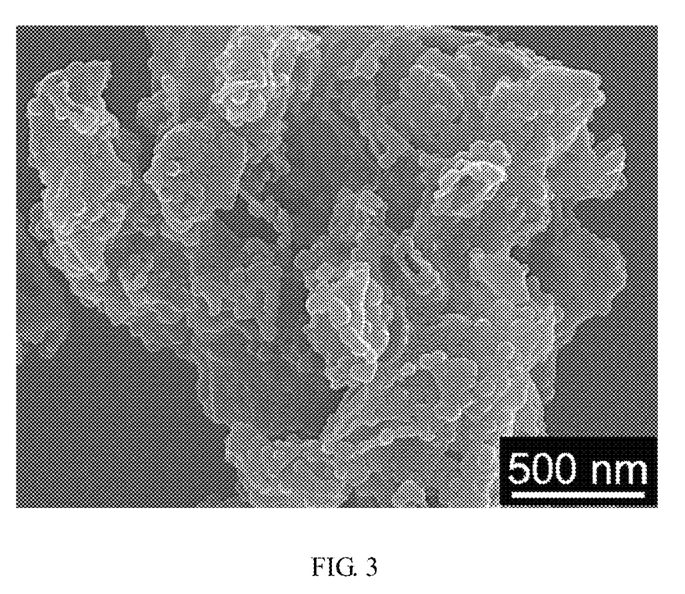
FIG. 3 is the SEM image of porous carbon nitride modified by MOFs.
Figure 4:
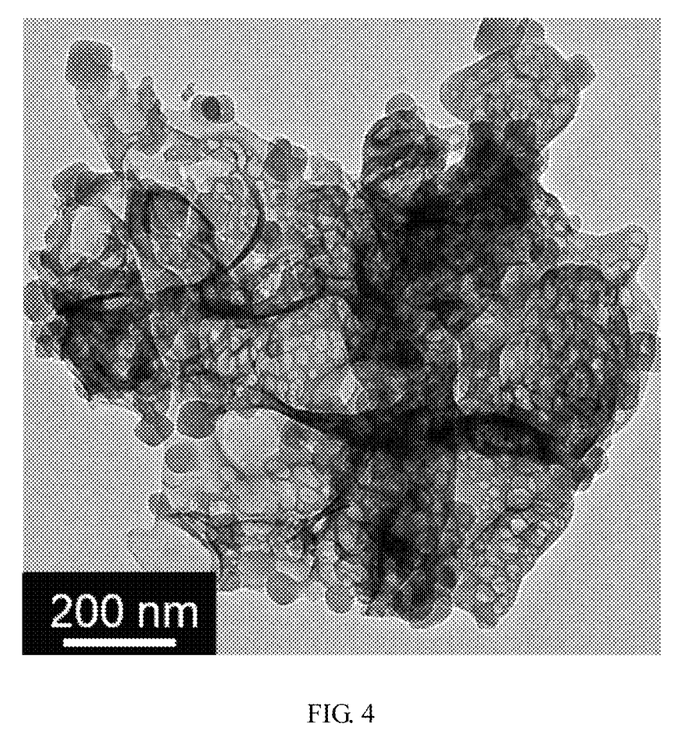
FIG. 4 is the TEM image of porous carbon nitride modified by MOFs.

25 mg of obtained carboxylated porous carbon nitride nanosheet is dispersed in a 0.01 mol/L copper nitrate ethanol solution, stirred for 15 minutes, washed with ethanol, and then dispersed to 0.005 mol/L of pyromellitic acid ethanol solution, and stirred for 30 minutes, then washed with ethanol, and then repeat the above dispersion process 5 times. At the end, the product is washed with an ethanol solution, then centrifuged, and finally vacuum dried for 3~6 hours to obtain porous carbon nitride modified by MOFs, that is PCN-HK material. FIG. 3 and FIG. 4 are the SEM and TEM images of PCN-HK respectively, and it can be seen from the images that the MOFs is successfully and uniformly modified to the surface of the carbon nitride.

Figure 5:
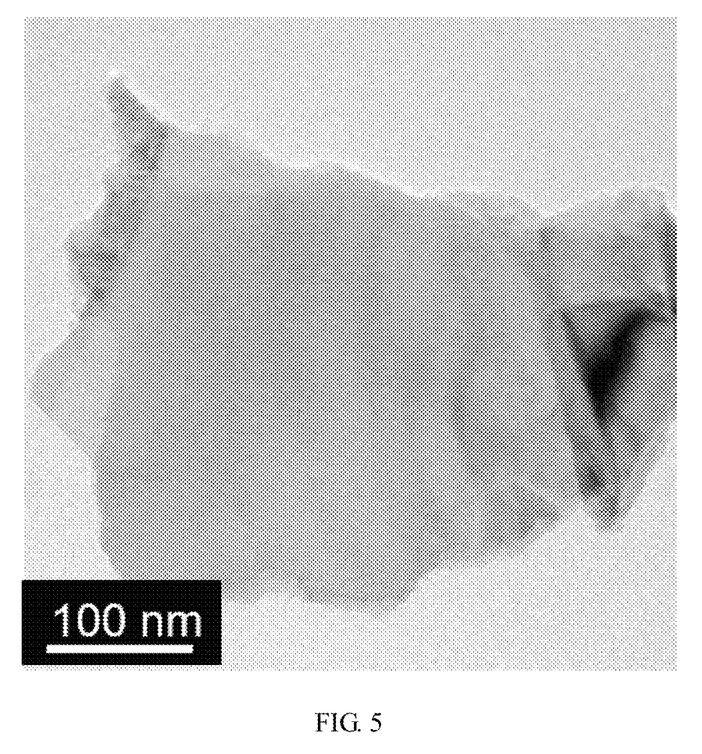
FIG. 5 is the TEM images of black phosphorus nanosheet.

The preparation of the two-dimensional black phosphorus material, the specific steps are as follows:
20 mg of the bulk black phosphorus material is placed in 25 mL of N-methylpyrrolidone, and ultrasonically pulverized by a cell pulverizer for 6 hours to obtain a two-dimensional black phosphorus N-methylpyrrolidone solution. FIG. 5 is a TEM image of two-dimensional black phosphorus, and it can be seen from the picture that the black phosphorus exhibits a thin sheet-like structure.

Figure 6:
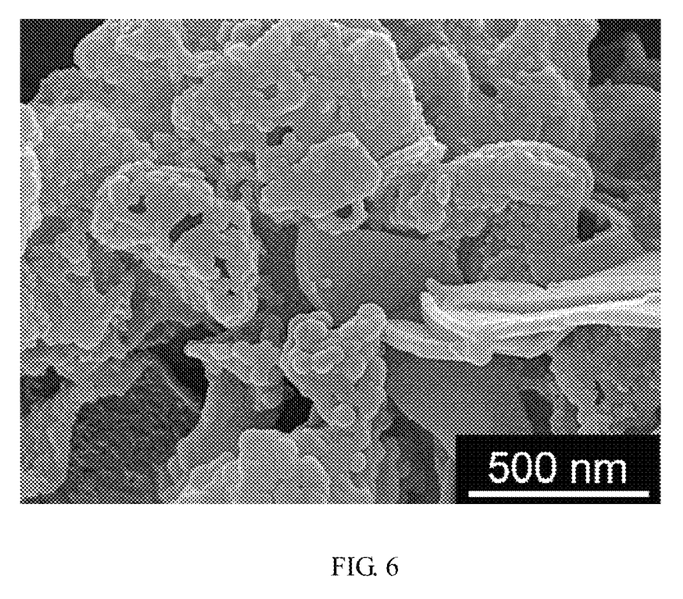
FIG. 6 is the SEM image of black phosphorus/porous carbon nitride modified by MOFs composite.
Figure 7:
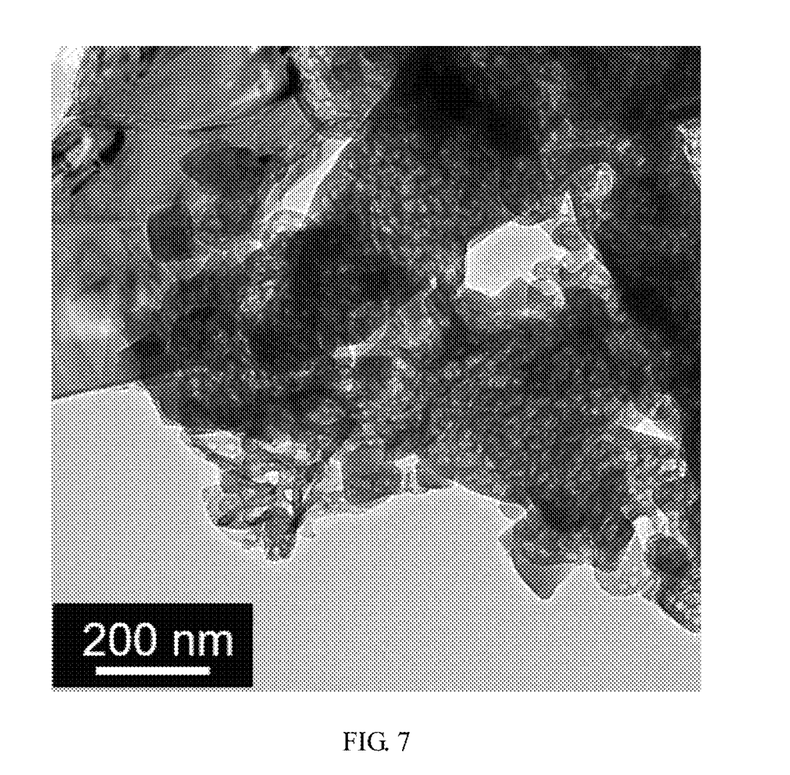
FIG. 7 is the TEM image of black phosphorus/porous carbon nitride modified by MOFs composite.

The preparation of the carbon nitride membrane composite material modified by black phosphorus/metal organic framework (MOF) is as follows:
50 mg of porous carbon nitride modified by MOFs and 3 mg of two-dimensional black phosphorus nanosheet are dispersed into 20 mL of N-methylpyrrolidone and the solution is stirred at room temperature for 6 hours, and the mixed solution is washed three times with an ethanol solution, and then suction-filtered onto the carbon nanotube film by a vacuum pump to obtain a carbon nitride membrane composite material modified by black phosphorus/metal organic framework (MOF). The process of suction filtration is: placing the carbon nanotube film on the killing filter funnel at room temperature, opening the vacuum water pump, and then pouring the mixed solution into the sand core funnel for suction filtration. FIG. 6 and FIG. 7 are the SEM and TEM images of a carbon nitride membrane composite material modified by black phosphorus/metal organic framework (MOF) respectively. It can be seen from the images that black phosphorus and porous carbon nitride modified by MOFs are combined successfully.

Embodiment 2

Figure 8:
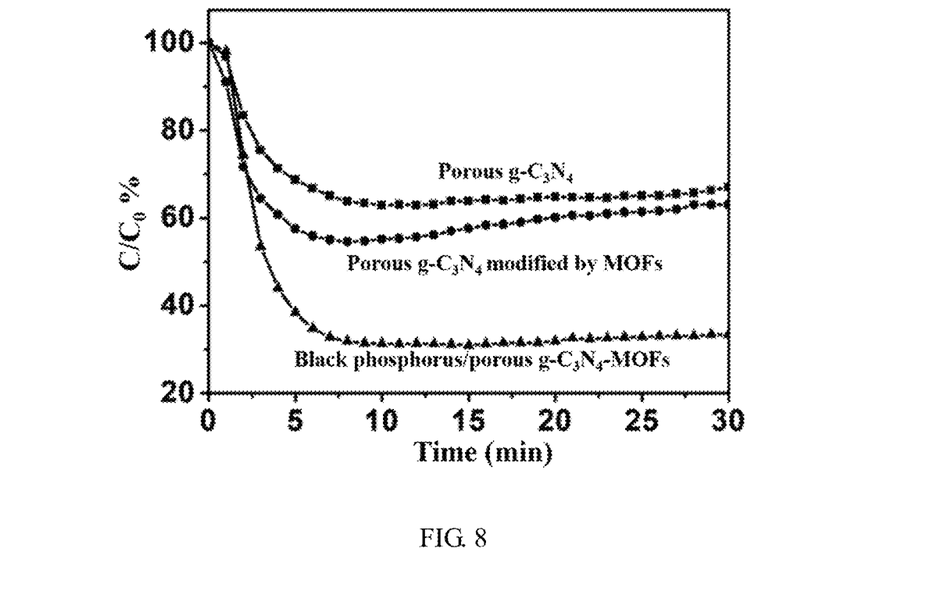
FIG. 8 is the effect chart of degrading nitric oxide.
Figure 9:
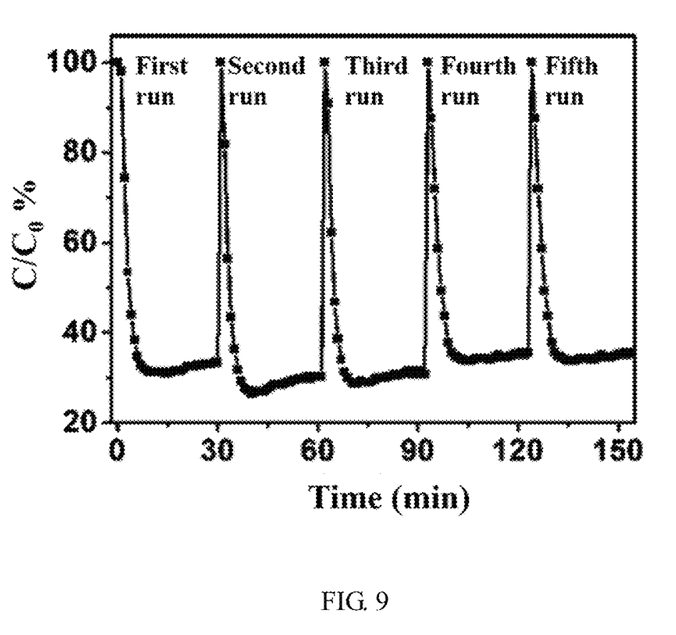
FIG. 9 is cycling of black phosphorus/porous carbon nitride modified by MOFs composite for NO degradation.

Photocatalytic degradation of nitric oxide gas, the specific steps are as follows:
A batch reactor (2.2 liters in volume) containing one quartz glass is used for the photocatalytic degradation of nitric oxide; 50 mg of carbon nitride membrane composite material modified by black phosphorus/metal organic framework (MOF) is placed in the batch reactor, the door is closed, the reactor is evacuated, the flow rate of high purity air (1 liter) and nitric oxide (concentration of 10 ppm) is adjusted so that the flow rate of the mixed gas is 1.2 liters per minute. After the concentration of nitrogen oxide concentration stabilized at 600 ppb for fifteen minutes, a xenon light is turned on to initiate the photo degradation reaction. The carbon nitride membrane composite material modified by black phosphorus/metal organic framework (MOF) photocatalyst can be recycled many times, with good stability, after 5 times of recycling, it still have a good catalytic effect. FIG. 8 is the effect of photocatalytic degradation NO by the carbon nitride membrane composite material modified by black phosphorus/metal organic framework (MOF); FIG. 9 is the photocatalytic material recycling effect.

The above analysis shows that the carbon nitride membrane composite material modified by black phosphorus/metal organic framework (MOF) prepared by the simple process of the invention has good photocatalytic effect on the nitric oxide gas; and can be recycled many times, The preparation process is relatively simple, the production raw materials are easy to obtain, and the like, and has application prospect in the treatment of nitrogen oxide body pollution.

What is claimed is:

1. A preparation method of a carbon nitride membrane composite material modified by black phosphorus/metal organic framework, characterized in comprising the following steps:
   (1) using urea as a raw material, calcining to prepare porous carbon nitride nanosheet;
   (2) carrying out carboxylation on the porous carbon nitride nanosheet, and modifying metal organic framework on it to obtain porous carbon nitride material modified by metal organic framework;
   (3) stripping block black phosphorus into a two-dimensional black phosphorus slice by solvent exfoliation method;
   (4) dispersing the porous carbon nitride material modified by metal organic framework and the two-dimensional black phosphorus slice in an organic solvent, stirring at room temperature and suction filtrating to obtain the carbon nitride membrane composite material modified by black phosphorus/metal organic framework.

2. The method according to claim 1, wherein in the step (1), the calcination condition is, calcining at 300 to 500° C. for 3 to 5 hours under air; the rate of temperature rise is 2 to 15° C. per minute.

3. The method according to claim 1, wherein in the step (2), at a mass ratio of 1:(10 to 20), mixing the porous carbon nitride nanosheet and succinic anhydride in a solvent, carrying out reaction at room temperature for 10-15 hours to complete the carboxylation of the porous carbon nitride nanosheet; immersing the carboxylated porous carbon nitride nanosheet sequentially in a copper nitrate solution and a trimesic acid solution to complete the modification of metal organic framework; the mass ratio of the carboxylated porous carbon nitride nanosheet, copper nitrate and trimesic acid is 1:(2~3):(1~2), and the time of immersing in the copper nitrate solution and the trimesic acid solution is respectively 10 to 20 minutes and 25 to 40 minutes.

4. The method according to claim 1, wherein in the step (3), the mass ratio of block black phosphorus and solvent is 1:(100 to 150); performing ultrasonic peeling using a cell pulverizer, and the peeling time is 4 to 8 hours; the solvent is N-methylpyrrolidone.

5. The method according to claim 1, wherein in the step (4), the mass ratio of the porous carbon nitride material modified by metal organic framework and the two-dimensional black phosphorus slice is 100:(2 to 10), stirring at room temperature for 6 to 8 hours, and finally filtrating in to a membrane; said organic solvent is N-methylpyrrolidone.

6. A preparation method of a porous carbon nitride material modified by metal organic framework, characterized in comprising the following steps:
   (1) using urea as a raw material, calcining to prepare porous carbon nitride nanosheet;
   (2) carrying out carboxylation on the porous carbon nitride nanosheet, and modifying metal organic framework on it to obtain porous carbon nitride material modified by metal organic framework.

7. The method according to claim 6, wherein in the step (1), the calcination condition is, calcining at 300 to 500° C. for 3 to 5 hours under air; the rate of temperature rise is 2 to 15° C. per minute.

8. The method according to claim 6, wherein in the step (2), at a mass ratio of 1:(10 to 20), mixing the porous carbon nitride nanosheet and succinic anhydride in a solvent, carrying out reaction at room temperature for 10-15 hours to complete the carboxylation of the porous carbon nitride nanosheet; immersing the carboxylated porous carbon nitride nanosheet sequentially in a copper nitrate solution and a trimesic acid solution to complete the modification of metal organic framework; the mass ratio of the carboxylated porous carbon nitride nanosheet, copper nitrate and trimesic acid is 1:(2~3):(1~2), and the time of immersing in the copper nitrate solution and the trimesic acid solution is respectively 10 to 20 minutes and 25 to 40 minutes.

9. A method of treating exhaust gas, characterized in comprising the following steps:
   (1) using urea as a raw material, calcining to prepare porous carbon nitride nanosheet;
   (2) carrying out carboxylation on the porous carbon nitride nanosheet, and modifying metal organic framework on it to obtain porous carbon nitride material modified by metal organic framework;
   (3) stripping block black phosphorus into a two-dimensional black phosphorus slice by solvent exfoliation method;
   (4) dispersing the porous carbon nitride material modified by metal organic framework and the two-dimensional black phosphorus slice in an organic solvent, stirring at room temperature and suction filtrating to obtain the carbon nitride membrane composite material modified by black phosphorus/metal organic framework;
   (5) under illumination, passing the exhaust gas through the carbon nitride membrane composite material modified by black phosphorus/metal organic framework to carry out the gas treatment.

10. The method according to claim 9, wherein in the step (1), the calcination condition is, calcining at 300 to 500° C. for 3 to 5 hours under air; the rate of temperature rise is 2 to 15° C. per minute.

11. The method according to claim 9, wherein in the step (2), at a mass ratio of 1:(10 to 20), mixing the porous carbon nitride nanosheet and succinic anhydride in a solvent, carrying out reaction at room temperature for 10-15 hours to complete the carboxylation of the porous carbon nitride nanosheet; immersing the carboxylated porous carbon nitride nanosheet sequentially in a copper nitrate solution and a trimesic acid solution to complete the modification of metal organic framework; the mass ratio of the carboxylated porous carbon nitride nanosheet, copper nitrate and trimesic acid is 1:(2~3):(1~2), and the time of immersing in the copper nitrate solution and the trimesic acid solution is respectively 10 to 20 minutes and 25 to 40 minutes.

12. The method according to claim 9, wherein in the step (3), the mass ratio of block black phosphorus and solvent is 1:(100 to 150); performing ultrasonic peeling using a cell pulverizer, and the peeling time is 4 to 8 hours; the solvent is N-methylpyrrolidone.

13. The method according to claim 9, wherein in the step (4), the mass ratio of the porous carbon nitride material modified by metal organic framework and the two-dimensional black phosphorus slice is 100:(2 to 10), stirring at room temperature for 6 to 8 hours, and finally filtrating in to a membrane; said organic solvent is N-methylpyrrolidone.

14. A carbon nitride membrane composite material modified by black phosphorus/metal organic framework prepared by the preparation method according to claim 1.

15. The application of the carbon nitride membrane composite material modified by black phosphorus/metal organic framework according to claim 14 in the exhaust gas photocatalytic treatment.

16. A porous carbon nitride material modified by metal organic framework prepared by the preparation method according to claim 6.

17. The application of the porous carbon nitride material modified by metal organic framework according to claim 16 in the exhaust gas photocatalytic treatment.

\* \* \* \* \*